US011953792B2

(12) United States Patent
Lv et al.

(10) Patent No.: US 11,953,792 B2
(45) Date of Patent: Apr. 9, 2024

(54) IRREGULARLY-SHAPED DISPLAY PANEL AND DISPLAY DEVICE

(71) Applicant: HKC CORPORATION LIMITED, Shenzhen (CN)

(72) Inventors: Li Lv, Shenzhen (CN); Tingting Shen, Shenzhen (CN); Yunyang Liu, Shenzhen (CN); Yuchun Xu, Shenzhen (CN); Guangchen Zhang, Shenzhen (CN); Zhiwei Li, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,808

(22) Filed: Dec. 22, 2022

(65) Prior Publication Data
US 2024/0069394 A1    Feb. 29, 2024

(30) Foreign Application Priority Data
Aug. 29, 2022  (CN) .......................... 202211040771.4

(51) Int. Cl.
*G02F 1/1335*   (2006.01)
*G02F 1/1362*   (2006.01)
*G02F 1/1368*   (2006.01)

(52) U.S. Cl.
CPC .. *G02F 1/136209* (2013.01); *G02F 1/136286* (2013.01); *G02F 1/1368* (2013.01)

(58) Field of Classification Search
CPC ......... G02F 1/136209; G02F 1/136286; G02F 1/1368
See application file for complete search history.

(56) References Cited

U.S. PATENT DOCUMENTS

2009/0102824 A1* 4/2009 Tanaka ................. G09G 3/3648
                                                    345/55
2010/0289994 A1* 11/2010 Nonaka .................... G09G 3/20
                                                    349/108

(Continued)

FOREIGN PATENT DOCUMENTS

CN    106992214 A    7/2017
CN    107479269 A    12/2017

(Continued)

OTHER PUBLICATIONS

CNIPA, Office Action for CN Application No. 202211040771.4, dated May 23, 2023.

(Continued)

*Primary Examiner* — Hoan C Nguyen
(74) *Attorney, Agent, or Firm* — Hodgson Russ LLP

(57) ABSTRACT

The irregularly-shaped display panel comprises a plurality of pixel units arranged in an array and a shielding layer. some of the pixel units are shielded by the shielding layer to form irregularly-shaped pixel units, and each of the irregularly-shaped pixel unit at least comprises a first irregularly-shaped pixel unit; in the first irregularly-shaped pixel unit, the areas of opening regions of at least two sub-pixels shielded by the shielding layer are different, and the sub-pixel having a larger area of an opening region shielded by the shielding layer has a greater pixel pressure difference.

18 Claims, 10 Drawing Sheets

(56) References Cited

U.S. PATENT DOCUMENTS

| | | | | |
|---|---|---|---|---|
| 2016/0120005 A1* | 4/2016 | Wu | ........................ | H05B 33/22 |
| | | | | 313/505 |
| 2017/0249910 A1* | 8/2017 | Tamaki | ............... | G02F 1/13439 |
| 2018/0143486 A1* | 5/2018 | Kadowaki | ......... | G02F 1/133514 |

FOREIGN PATENT DOCUMENTS

| | | | | | |
|---|---|---|---|---|---|
| CN | 108732826 | A | | 11/2018 | |
| CN | 108962034 | A | | 12/2018 | |
| CN | 108986741 | A | | 12/2018 | |
| CN | 109087591 | A | | 12/2018 | |
| CN | 109307965 | A | | 2/2019 | |
| CN | 109559705 | A | | 4/2019 | |
| CN | 109884827 | A | | 6/2019 | |
| CN | 110687726 | A | | 1/2020 | |
| JP | 2017134339 | A | * | 8/2017 | ......... G02F 1/13306 |

OTHER PUBLICATIONS

CNIPA, Second Office Action for CN Application No. 202211040771.4, dated Aug. 3, 2023.

* cited by examiner

| W(μm) | L(μm) | Charging Rate (%) |
|---|---|---|
| 3 | 3.7 | 78.2 |
| 6 | 3.7 | 88.4 |
| 9 | 3.7 | 93.6 |
| 12 | 3.7 | 96.3 |
| 15 | 3.7 | 97.8 |
| 20 | 3.7 | 98.5 |
| 25 | 3.7 | 99.6 | though the pixel units are
IRREGULARLY-SHAPED DISPLAY PANEL AND DISPLAY DEVICE

CROSS-REFERENCE TO RELATED APPLICATION

This application claims priority to Chinese Patent Application No. 202211040771.4, filed Aug. 29, 2022, the entire disclosure of which is incorporated herein by reference.

TECHNICAL FIELD

The present disclosure relates to the field of display technology, in particular to an irregularly-shaped display panel and a display device.

BACKGROUND

With the continuous development in the field of display technology, the demand for an irregularly-shaped display panel becomes larger. The main difference of the irregularly-shaped display panel is that the edge position of the display region thereof comprises a special shape exhibiting a non-rectangular shape, i.e., the display region comprises an irregularly-shaped boundary; however, the pixel units are usually designed to be a regular structure such as a rectangle, and therefore, at the irregularly-shaped boundary close to the display panel, in order to achieve the irregularly-shaped boundary, the arrangement of the pixel units is mostly in a zigzag shape.

At present, in order to eliminate the zigzag lines, a black matrix (BM) shielding may be used to make the irregularly-shaped boundary of the display region smoother. However, this method makes the shielded areas of opening regions of the sub-pixels in one pixel unit different, causing the display color of the pixel unit to cast, and affecting the display effect of the display region close to the irregularly-shaped boundary.

SUMMARY

There are provided an irregularly-shaped display panel and a display device according to embodiments of the present disclosure. The technical solution is as below:

According to a first aspect of the present disclosure, there is provided an irregularly-shaped display panel. The irregularly-shaped display panel comprises a pixel unit and a shielding layer, wherein a plurality of pixel units are provided and are arranged in an array, each of the pixel units comprises a plurality of sub-pixels, an opening region of each of the sub-pixels comprises a pixel electrode and a common electrode which is opposite to the pixel electrode and is insulated from the pixel electrode, and a pixel voltage difference is formed between the common electrode and the pixel electrode; wherein some of the pixel units are shielded by the shielding layer to form irregularly-shaped pixel units, and each of the irregularly-shaped pixel units at least comprises a first irregularly-shaped pixel unit; in the first irregularly-shaped pixel unit, the area of an opening region of at least one sub-pixel shielded by the shielding layer is greater than 0 and less than the area of an opening region of at least one sub-pixel, and the areas of opening regions of the remaining sub-pixels shielded by the shielding layer are greater than or equal to 0 and less than the area of an opening region of the remaining sub-pixels; and wherein in the first irregularly-shaped pixel unit, the areas of opening regions of at least two sub-pixels shielded by the shielding layer are different, and the sub-pixel having a larger area of an opening region shielded by the shielding layer has a larger pixel voltage difference.

According to a second aspect of the present disclosure, there is provided a display device, comprising a drive chip and the irregularly-shaped display panel, wherein the drive chip is connected to sub-pixels of the irregularly-shaped display panel, the irregularly-shaped display panel comprises a pixel unit and a shielding layer, wherein a plurality of pixel units are provided and are arranged in an array, each of the pixel units comprises a plurality of sub-pixels, an opening region of each of the sub-pixels comprises a pixel electrode and a common electrode which is opposite to the pixel electrode and is insulated from the pixel electrode, and a pixel voltage difference is formed between the common electrode and the pixel electrode; wherein some of the pixel units are shielded by the shielding layer to form irregularly-shaped pixel units, and each of the irregularly-shaped pixel units at least comprises a first irregularly-shaped pixel unit; in the first irregularly-shaped pixel unit, the area of an opening region of at least one sub-pixel shielded by the shielding layer is greater than 0 and less than the area of an opening region of at least one sub-pixel, and the areas of opening regions of the remaining sub-pixels shielded by the shielding layer are greater than or equal to 0 and less than the area of an opening region of the remaining sub-pixels; and wherein in the first irregularly-shaped pixel unit, the areas of opening regions of at least two sub-pixels shielded by the shielding layer are different, and the sub-pixel having a larger area of an opening region shielded by the shielding layer has a larger pixel voltage difference.

It should be understood that the foregoing general description and the following detailed description are only exemplary and are not intended to limit the present disclosure.

BRIEF DESCRIPTION OF THE DRAWINGS

The above and other objects, features and advantages of the present disclosure will become more apparent by describing in detail exemplary embodiments thereof with reference to the accompanying drawings.

DETAILED DESCRIPTION OF THE EMBODIMENTS

Exemplary embodiments will now be described more fully with reference to the accompanying drawings. However, exemplary embodiments may be embodied in many different forms and should not be construed as limited to the examples set forth herein; on the contrary, these embodiments are provided so that the present disclosure will be thorough and complete, and will fully convey the concept of exemplary embodiments to a person skilled in the art.

In the present disclosure, the terms "first" and "second" are only used for descriptive purposes, and cannot be understood as indicating or implying relative importance or implicitly indicating the number of indicated technical features. Hence, the features defined by "first" and "second" may explicitly or implicitly include one or more of the features. In the description of the present disclosure, "a plurality of" means two or more than two, unless specified otherwise.

Furthermore, the described features, structures, or characteristics may be combined in any suitable manner in one or more embodiments. In the following description, numerous specific details are provided to give a thorough understanding of embodiments of the present disclosure. However, a person skilled in the art will realize that the technical solutions of the present disclosure may be practiced without one or more of specific details, or other methods, components, devices, steps, etc. may be adopted. In other instances, well-known methods, devices, implementations or operations are not shown or described in detail to avoid obscuring aspects of the present disclosure.

First Embodiment

Figure 1:
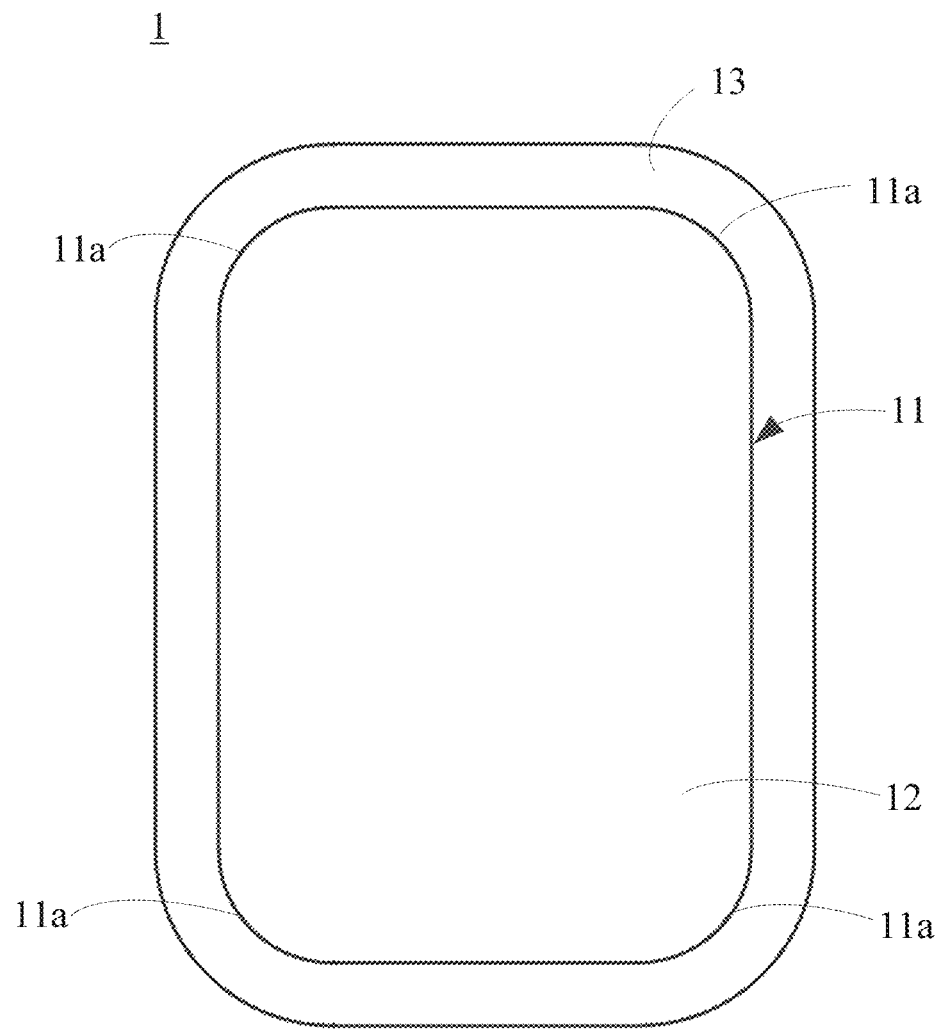
FIG. 1 is a schematic diagram showing a contour line of the irregularly-shaped display panel described in a first embodiment to a third embodiment of the present disclosure.

As shown in FIG. 1, a first embodiment of the present disclosure provides an irregularly-shaped display panel 1. The irregularly-shaped display panel 1 has a dividing contour line 11, so as to divide the irregularly-shaped display panel 1 into a display region 12 and a non-display region 13 surrounding the display region 12. The dividing contour line 11 may have an irregularly-shaped boundary 11a, so that the display region 12 is an irregularly-shaped region. The irregularly-shaped region herein refers to a non-rectangular region, for example, the corner as shown in FIG. 1 is an arc-shaped region; or the whole region is round or oval.

The irregularly-shaped display panel 1 may comprise a plurality of pixel units arranged in an array, a plurality of data signal lines spaced apart from each other, and a plurality of scanning signal lines spaced apart from each other. In combination with FIGS. 2 and 3, a plurality of pixel units 14 are arranged in an array in a row direction X and in a column direction Y, a data signal line 15 extends entirely in the column direction Y, and a scanning signal line 16 extends entirely in the row direction X.

In the present embodiment, the pixel unit 14 may comprise a plurality of sub-pixels 140; for example, in the pixel unit 14, the plurality of sub-pixels 140 are arranged sequentially in the row direction X. The opening regions of the sub-pixels 140 in the present embodiment may comprise a pixel electrode 1401, a common electrode (not shown in the figure) and a color filter (not shown in the figure). The pixel electrode 1401 is completely positioned within a grid region formed by the data signal line 15 and the scanning signal line 16, at least part of the common electrode and the color filter is positioned within the grid region formed by the data signal line 15 and the scanning signal line 16; the color filter, the common electrode and the pixel electrode 1401 are arranged opposite each other in the thickness direction of the irregularly-shaped display panel 1; and the thickness direction is a direction perpendicular to the row direction X and the column direction Y. The pixel electrode 1401 and the common electrode are opposite each other and are insulated from each other, and a pixel voltage difference may be formed between the common electrode and the pixel electrode 1401.

For example, the irregularly-shaped display panel 1 of the present embodiment may be a liquid crystal display panel, and the liquid crystal display panel may comprise an array substrate and an opposed substrate which are aligned and assembled, and liquid crystal molecules filled between the array substrate and the opposed substrate.

When the irregularly-shaped display panel 1 is a liquid crystal display panel, the pixel electrode 1401 of the sub-pixel 140 may be positioned on the array substrate, and the common electrode may be positioned on the opposed substrate, that is to say, the pixel electrode 1401 and the common electrode are positioned on both sides of the liquid crystal molecules, and different voltages are written into the pixel electrode 1401 and the common electrode to form a pixel voltage difference, that is to say, a vertical electric field is formed between the pixel electrode 1401 and the common electrode to drive the liquid crystal molecules therebetween to deflect. However, it should be understood that, the pixel electrode 1401 and the common electrode of the sub-pixel 140 may also be positioned on the same substrate and arranged opposite each other in the row direction X, so as to form a horizontal electric field to drive the liquid crystal molecules thereabove to deflect, as required.

The color filter of the sub-pixel 140 may be disposed on the opposed substrate, but is not limited thereto, and may also be disposed on the array substrate.

For example, the pixel electrode 1401 and the common electrode may be transparent electrodes, such as ITO (indium tin oxide) electrodes.

Figure 3:
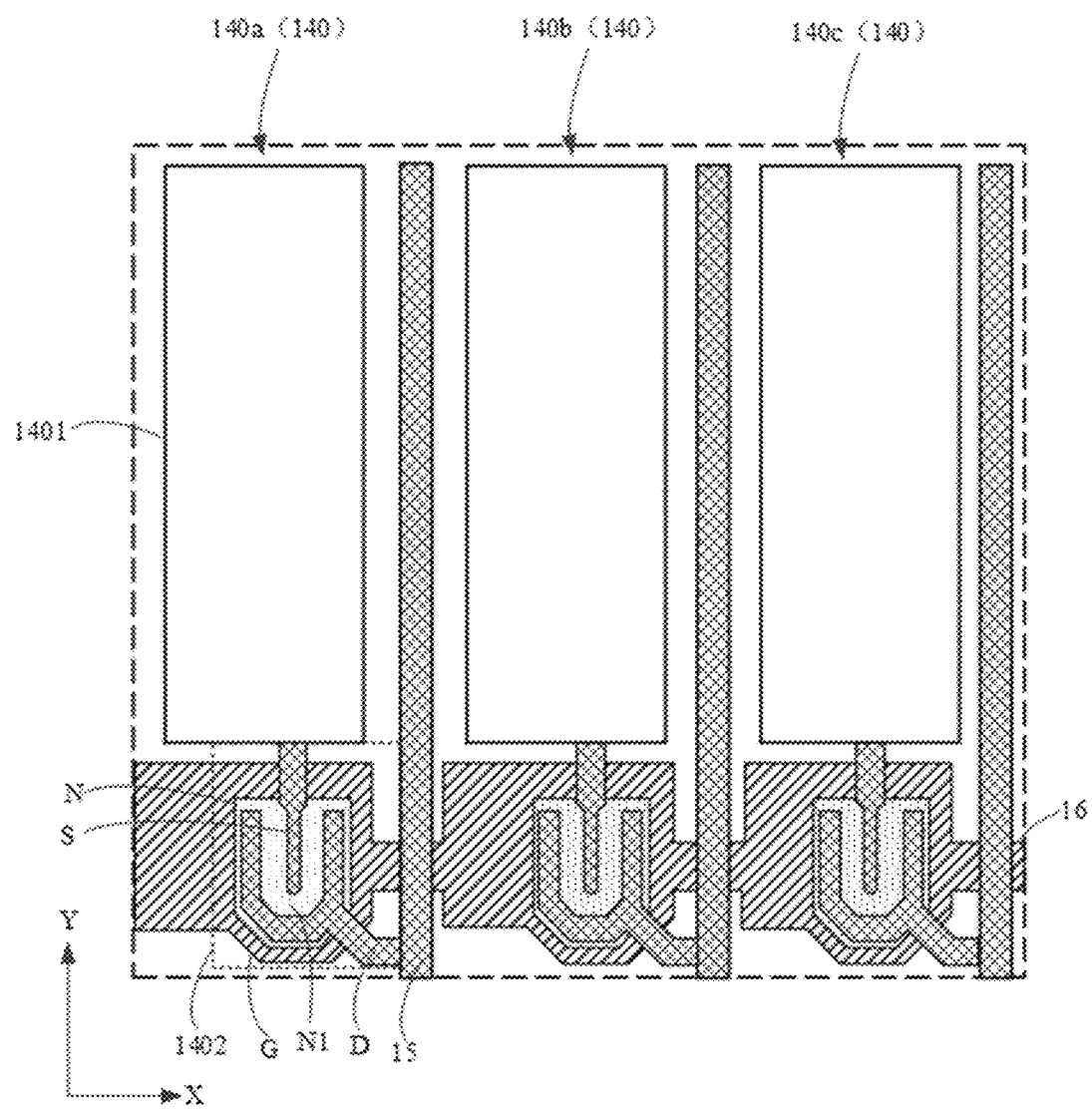
FIG. 3 is a schematic diagram showing a connection relationship among pixel units, data signal lines and scanning signal lines in the irregularly-shaped display panel described in a first embodiment of the present disclosure.

As shown in FIG. 3, a non-opening region of each of the sub-pixels 140 may comprise a drive transistor 1402, a gate G of the drive transistor 1402 is connected to the scanning signal line 16, a first electrode of the drive transistor 1402 is connected to the data signal line 15, a second electrode of the drive transistor 1402 is connected to the pixel electrode 1401. It should be understood that, one of the first electrode and the second electrode is a drain D, and the other of the first electrode and the second electrode is a source S.

For example, as shown in FIG. 3, the drive transistor 1402 in the present embodiment is N-type, the drain D of the drive transistor 1402 is connected to the data signal line 15, the source S is connected to the pixel electrode 1401, the gate G of the drive transistor 1402 may respond to a scanning signal from the scanning signal line 16, and under the control of the gate G, the data signal line 15 connected to the drain D charges and discharges through the drive transistor 1402 to the pixel electrode 1401 connected to the source S. The function of the gate G is to control the conductivity of the drive transistor 1402. When it is required to charge and discharge the pixel electrode 1401, the drive transistor 1402 operates in an on state with a large current, and when it is not required to charge and discharge the pixel electrode 1401, the drive transistor 1402 operates in an off state with a small current. The large current in the on state carries the function of charging and discharging, and the larger the current is, the faster and more sufficient the charging and discharging are. The low current in the off state affects the leakage speed of the pixel, the smaller the better.

Figure 2:
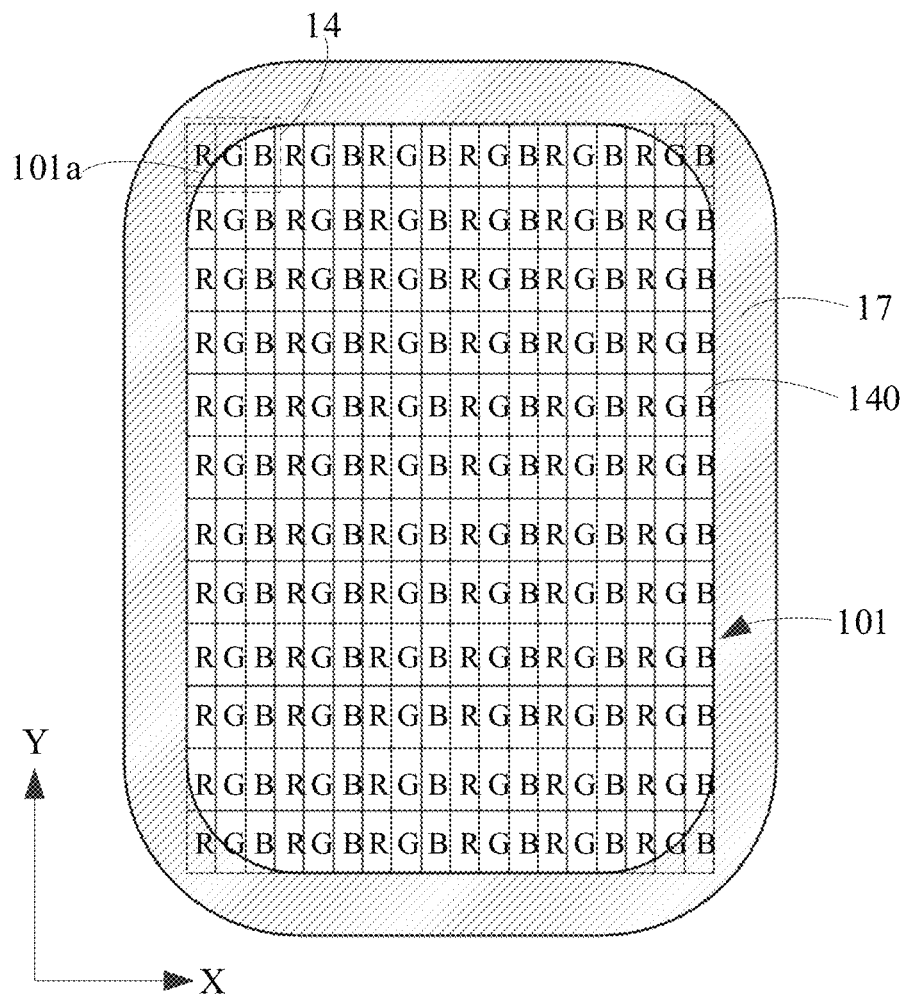
FIG. 2 is a schematic diagram showing an arrangement of pixel units in the irregularly-shaped display panel described in a first embodiment to a third embodiment of the present disclosure.

As shown in FIG. 2, the pixel unit 14 may comprise three sub-pixels 140, that is, as shown in FIG. 3, a first sub-pixel 140a, a second sub-pixel 140b, and a third sub-pixel 140c are sequentially arranged in a plane along an irregularly-shaped edge of the irregularly-shaped display panel 1. Color filters of the first sub-pixel 140a, the second sub-pixel 140b, and the third sub-pixel 140c have different colors. For example, a color filter of the first sub-pixel 140a is red (R), a color filter of the second sub-pixel 140b is green (G), and a color filter of the third sub-pixel 140c is blue (B). It should be understood that, the pixel unit 14 is not limited to be composed of three sub-pixels 140, and may also comprise two, or four sub-pixels, etc., and color filters are not limited to the red, green, blue, etc. mentioned above, and may also be of other colors, such as yellow, white, etc., as required.

As shown in FIG. 3, in the present embodiment, the gate G of the drive transistor 1402 of each row of sub-pixels 140 is correspondingly connected to a row of scanning signal lines 16, the drain D of the drive transistor 1402 of each column of sub-pixels 140 is correspondingly connected to a column of data signal lines 15 and sequentially provides scanning signals to each row of scanning signal lines 16, so as to control the drive transistor 1402 of each row of sub-pixels 140 connected thereto to be conducted. At this time, the data drive circuit transmits the potential of the data signal of this row to the pixel electrode 1401 through the data signal line 15 and the drive transistor 1402 for charging; after charging the sub-pixels 140 of the whole display area 12 in sequence, the pixel charging of the next screen is repeated.

Figure 4:
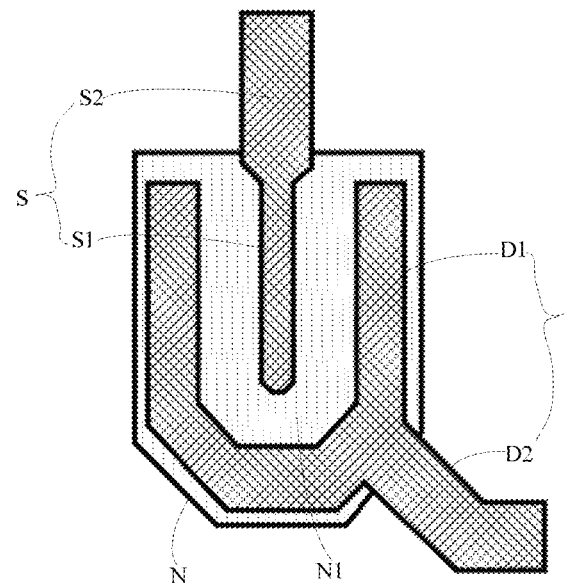
FIG. 4 is a schematic diagram showing an active layer, a drain and a source in the drive transistor described in a first embodiment to a third embodiment of the present disclosure.

The drive transistor 1402 of the present embodiment may have a U-shaped channel region N1, as shown in FIGS. 3 and 4. In this way, it is ensured that the width-to-length ratio of the U-shaped channel region N1 satisfies the requirements, and the volume of the drive transistor 1402 is also appropriately reduced, so that the proportion of a non-opening region may be reduced, and the opening ratio of a pixel is increased.

With reference to FIGS. 3 and 4, in combination with the detailed description, an active layer N of the drive transistor 1402 is projected in a gate G of the drive transistor 1402; the first electrode (i.e., the drain D shown in FIGS. 3 and 4) of the drive transistor 1402 comprises a U-shaped portion D1 and a first connection portion D2, the U-shaped portion D1 is projected in the active layer N of the drive transistor 1402, the first connection portion D2 is connected to the U-shaped portion D1 and the data signal line 15; the second electrode (i.e., the source electrode S shown in FIGS. 3 and 4) of the drive transistor 1402 comprises an insertion portion S1 and a second connection portion S2, the insertion portion S1 is orthographically projected in the active layer N of the drive transistor 1402, the insertion portion S1 is inserted into the U-shaped portion D1 and forms a U-shaped channel region N1 with the U-shaped portion D1, and the second connection portion S2 is connected to the insertion portion S1 and the pixel electrode 1401.

In the present embodiment, as shown in FIG. 2, the whole pixel units 14 may be seen as a rectangular structure, and the whole sub-pixels 140 and opening regions of the sub-pixels 140 in the pixel unit 14 may also be seen as a rectangular structure.

In the pixel unit 14, the opening regions of the sub-pixels 140 may have the same size, but are not limited thereto, and may also be adjusted differently according to actual situations. The present embodiment is described in detail by taking the case that the opening regions of the sub-pixels 140 have the same size as an example.

Figure 5:
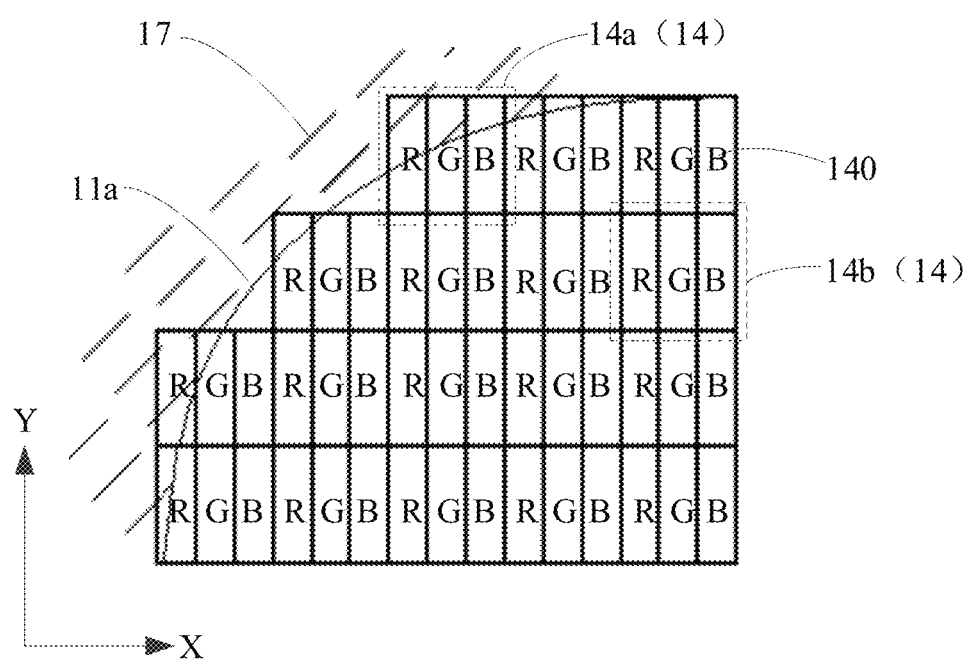
FIG. 5 is a partial schematic diagram showing another arrangement of pixel units in the irregularly-shaped display panel described in a first embodiment to a third embodiment of the present disclosure.

For example, as shown in FIG. 2, the plurality of pixel units 14 may be arranged in an array and be in a rectangular structure, and may also be arranged in a shape adaptive to the irregularly-shaped shape of the display region 12. For example, when the display region 12 is an irregularly-shaped region in which the corner is arc-shaped, the plurality of pixel units 14 at the corner may also be arranged in a staggered and stepped manner, as shown in FIG. 5, so as to form a shape adaptive to the arc-shaped corner. It should be understood that, in FIG. 5, a dashed line outside the irregularly-shaped boundary 11a is shielded as a region shielded by the shielding layer 17. However, neither of the two arrangement forms may ensure smoothness of the irregularly-shaped boundary 11a of the display region 12.

In order to ensure the smoothness of the irregularly-shaped boundary 11a and improve the edge zigzag situation, the irregularly-shaped display panel 1 of the present embodiment may further comprise a shielding layer 17. As shown in FIG. 2, the shielding layer 17 may comprise the dividing contour line 11 described above, that is to say, in the present embodiment, a display region 12 and a non-display region 13 of the irregularly-shaped display panel 1 are determined by means of the shielding layer 17, and the required irregularly-shaped display region 12 may be designed by adjusting the shape of the dividing contour line 11 of the shielding layer 17.

In the present embodiment, as shown in FIGS. 2 and 5, the pattern contour lines arranged for the plurality of pixel units 14 do not completely coincide with the irregularly-shaped boundary 11a of the dividing contour line 11 at the corners. Specifically, when the smoothness of the irregularly-shaped boundary 11a is ensured, some of the pixel units 14 may be shielded by the shielding layer 17 to form the irregularly-shaped pixel units. It should be understood that, the irregularly-shaped display panel 1 further comprises normal pixel units 14b, and the normal pixel units 14b refer to pixel units 14 of which opening regions of the sub-pixels 140 are not shielded.

The irregularly-shaped pixel unit at least comprises a first irregularly-shaped pixel unit 14a. In the first irregularly-shaped pixel unit 14a of the present embodiment, the area of an opening region of at least one sub-pixel 140 shielded by a shielding layer 17 is greater than 0 and less than the opening region thereof, and the areas of opening regions of the other sub-pixels 140 shielded by the shielding layer 17 are greater than or equal to 0 and less than the opening area thereof.

That is to say, the irregularly-shaped boundary 11a of the dividing contour line 11 on the shielding layer 17 divides the opening region of at least one sub-pixel 140 in the first irregularly-shaped pixel unit 14a into two parts, one part is a shielding region shielded by the shielding layer 17 and not allowing light to pass through, and the other part is a light-transmitting region not shielded by the shielding layer 17 and allowing light to pass through.

In the present embodiment, in addition to the first irregularly-shaped pixel unit 14a, the irregularly-shaped pixel unit may also comprise a second irregularly-shaped pixel unit (not shown in the figure), and in the second irregularly-shaped pixel unit, there is at least one sub-pixel having an opening region completely shielded by the shielding layer 17. However, it should be understood that the irregularly-shaped pixel unit of the present embodiment may only comprise the first irregularly-shaped pixel unit 14a and does not comprise the second irregularly-shaped pixel unit, as required.

In the present embodiment, the sub-pixel having an area of an opening region shielded by the shielding layer 17 larger than 0 and less than that of the opening region of the shielding layer is defined as an irregularly-shaped sub-pixel, and the sub-pixel having an area of an opening region shielded by the shielding layer 17 equal to 0 and less than that of the opening region of the shielding layer is defined as a normal sub-pixel; that is to say, the first irregularly-shaped pixel unit 14a may comprise at least one irregularly-shaped sub-pixel, for example, when the first irregularly-shaped pixel unit 14a comprises three sub-pixels, there may be one irregularly-shaped sub-pixel and two normal sub-pixels; or two irregularly-shaped sub-pixels, and one normal sub-pixel; or three irregularly-shaped sub-pixels.

For example, in the present embodiment, at least two sub-pixels 140 in the first irregularly-shaped pixel unit 14a have different areas of opening regions shielded by the shielding layer 17, for example, there are an irregularly-shaped sub-pixel (i.e., a sub-pixel having an area of an opening region shielded by the shielding layer 17 larger than 0) and a normal sub-pixel (i.e., a sub-pixel having an area of an opening region shielded by the shielding layer 17 equal to 0) in the first irregularly-shaped unit 14a; or all sub-pixels in the first irregularly-shaped pixel unit 14a are irregularly-shaped sub-pixels, but only at least two irregularly-shaped sub-pixels have different areas of the opening regions shielded by the shielding layer 17.

As opening regions of at least two sub-pixels 140 in the first irregularly-shaped pixel unit 14a are shielded from different areas by a shielding layer 17, light-transmitting areas of the sub-pixels 140 changes differently, thereby causing inconsistent changes in actual brightness of the sub-pixels 140. For example, in combination with FIGS. 5 and 7, as the shielding areas of opening regions of a first sub-pixel 140a, a second sub-pixel 140b and a third sub-pixel 140c in the first irregularly-shaped pixel unit 14a are sequentially reduced, that is to say, three sub-pixels in the first irregularly-shaped pixel unit 14a are all irregularly-shaped sub-pixels, when corresponding to the same grayscale, a brightness change value of the first sub-pixel 140a of the normal pixel unit 14b and a first sub-pixel 140a of the first irregularly-shaped pixel unit 14a, a brightness change value of the second sub-pixel 140b of the normal pixel unit 14b and a second sub-pixel 140b of the first irregularly-shaped pixel unit 14a, and a brightness change value of the third sub-pixel 140c of the normal pixel unit 14b and a third sub-pixel 140c of the first irregularly-shaped pixel unit 14a are sequentially reduced, so that each sub-pixel 140 of the first irregularly-shaped pixel unit 14a and the normal pixel unit 14b corresponds to the same display grayscale, but the corresponding display color finally deviates, that is, the first irregularly-shaped pixel unit 14a appears color cast.

In order to improve the display color cast of the first irregularly-shaped pixel unit 14a, the present embodiment provides a solution. In the first irregularly-shaped pixel unit 14a, a sub-pixel 140 having a larger area of an opening region shielded by a shielding layer 17 has a larger pixel voltage difference; that is to say, in the first irregularly-shaped pixel unit 14a, the areas of opening regions of the first sub-pixel 140a, the second sub-pixel 140b and the third sub-pixel 140c shield by the shielding layer 17 are sequentially reduced, and the pixel voltage differences of the first sub-pixel 140a, the second sub-pixel 140b and the third sub-pixel 140c are sequentially reduced; therefore, the sub-pixel 140 having a larger area of an opening region shielded by the shielding layer 17 has a higher transmittance; and the loss of different opening areas is balanced by adjusting the transmittance, so as to ensure that the brightness of the sub-pixels 140 is relatively balanced and substantially consistent, thereby improving the display color cast of the first irregularly-shaped pixel unit 14a, and further ensuring the display effect of the whole display picture.

When the normal pixel unit 14b and the first irregularly-shaped pixel unit 14a display the same color, the pixel voltage difference of the irregularly-shaped sub-pixels in the first irregularly-shaped pixel unit 14a is greater than the pixel voltage difference of the normal sub-pixels of the same color in the normal pixel unit 14b. For example, when the first sub-pixel 140a, the second sub-pixel 140b and the third sub-pixel 140c in the first irregularly-shaped pixel unit 14a are all irregularly-shaped sub-pixels, and the areas of opening regions of the first sub-pixel 140a, the second sub-pixel 140b and the third sub-pixel 140c shielded are successively reduced, the pixel voltage difference of the first sub-pixel 140a in the first irregularly-shaped pixel unit 14a is greater than the pixel voltage difference of the first sub-pixel 140a in the normal pixel unit 14b, the pixel voltage difference of the second sub-pixel 140b in the first irregularly-shaped pixel unit 14a is greater than the pixel voltage difference of the second sub-pixel 140b in the normal pixel unit 14b, and the pixel voltage difference of the third sub-pixel 140c in the first irregularly-shaped pixel unit 14a is greater than the pixel voltage difference of the third sub-pixel 140c in the normal pixel unit 14b, so that the display color balance of the normal pixel unit 14b and the first irregularly-shaped pixel unit 14a may be ensured, and thus the color display effect may be improved.

Figure 6:
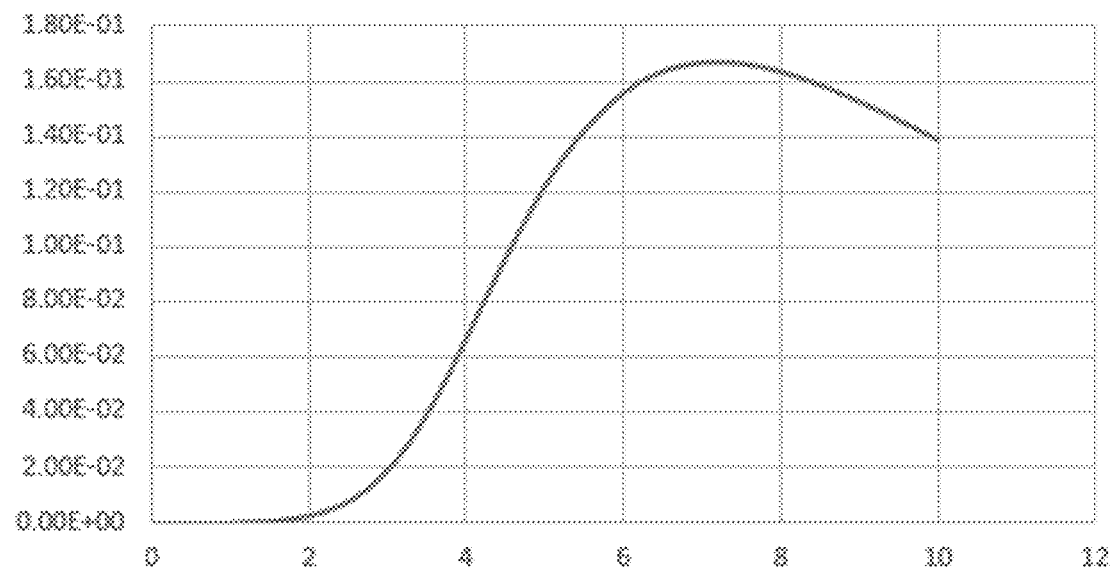
FIG. 6 is a schematic diagram showing a relationship between a pixel voltage difference and transmittance of sub-pixels described in a first embodiment to a third embodiment of the present disclosure.

For example, FIG. 6 is a schematic diagram showing a relationship between the pixel voltage difference and the transmittance, wherein the horizontal coordinate is the pixel voltage difference, and the vertical coordinate is the transmittance. It may be determined from the figure that when the pixel voltage difference is in the range of 0 V to about 7.5 V, the pixel voltage difference and the transmittance have a positive correlation relationship, that is, the larger the pixel voltage difference is, the larger the transmittance is; when the pixel voltage difference is in the range of 7.5 V to 1 V, the pixel voltage difference and the transmittance have a negative correlation, that is, the larger the pixel voltage difference is, the smaller the transmittance is; on the basis of this, the pixel voltage difference of the sub-pixel 140 having the largest area of an opening region shielded by the shielding layer 17 in the present embodiment should be below 7.5 V.

It should be understood that, the described pixel voltage difference refers to a voltage difference between the pixel electrode 1401 and the common electrode. Therefore, in order to make the pixel voltage differences of the sub-pixels 140 in the first irregularly-shaped pixel unit 14a different, at least one of the common voltage at the common electrode and the pixel voltage at the pixel electrode 1401 may be adjusted.

Specifically, in the present embodiment, only the pixel voltages at the pixel electrodes 1401 are adjusted to be different, and the common voltages at the common electrodes of the sub-pixels 140 are all equal, for example, the common voltages at the common electrodes of the sub-pixels 140 are all 0 V; that is, in the first irregularly-shaped pixel unit 14a, the common voltages at the common electrodes of the sub-pixels 140 are equal, the sub-pixels 140 having a larger area of an opening region shielded by the shielding layer 17 has a larger pixel voltage of the pixel electrode 1401.

In the present embodiment, the pixel voltage difference of each sub-pixel 140 in the irregularly-shaped display unit is adjusted by adjusting the pixel voltage at the pixel electrode 1401, so that the display color cast of the first irregularly-shaped pixel unit 14a is improved, the common electrode layer does not need to be redesigned, that is, adjustment layers of the common electrodes of the sub-pixels 140 in the display region 12 are arranged in one layer and connected to each other.

In order to adjust a pixel voltage at a pixel electrode 1401 in a first irregularly-shaped pixel unit 14a, the method used in the present embodiment is to adjust a data voltage written by a data signal line 15 correspondingly connected to each sub-pixel 140. It should be understood that, during design, the position and size of an opening region of each sub-pixel 140 in the first irregularly-shaped pixel unit 14a which is shielded and not shielded may be determined; when a pixel in an edge display region 12 is charged, a specified data signal (i.e., a data voltage) is input, so that a pixel voltage difference between the pixel electrode 1401 and a common electrode in the sub-pixel 140 may be changed, thereby changing the brightness of the sub-pixel 140 and compensating for color cast. That is to say, in the first irregularly-shaped pixel unit 14a, a sub-pixel 140 having a larger area of the opening region shielded by a shielding layer 17 has a larger data voltage written by a correspondingly connected data signal line 15. This adjustment method may also reduce the difficulty of structural design while adjusting a pixel voltage difference of each sub-pixel 140 in an irregularly-shaped display unit.

Figure 7:
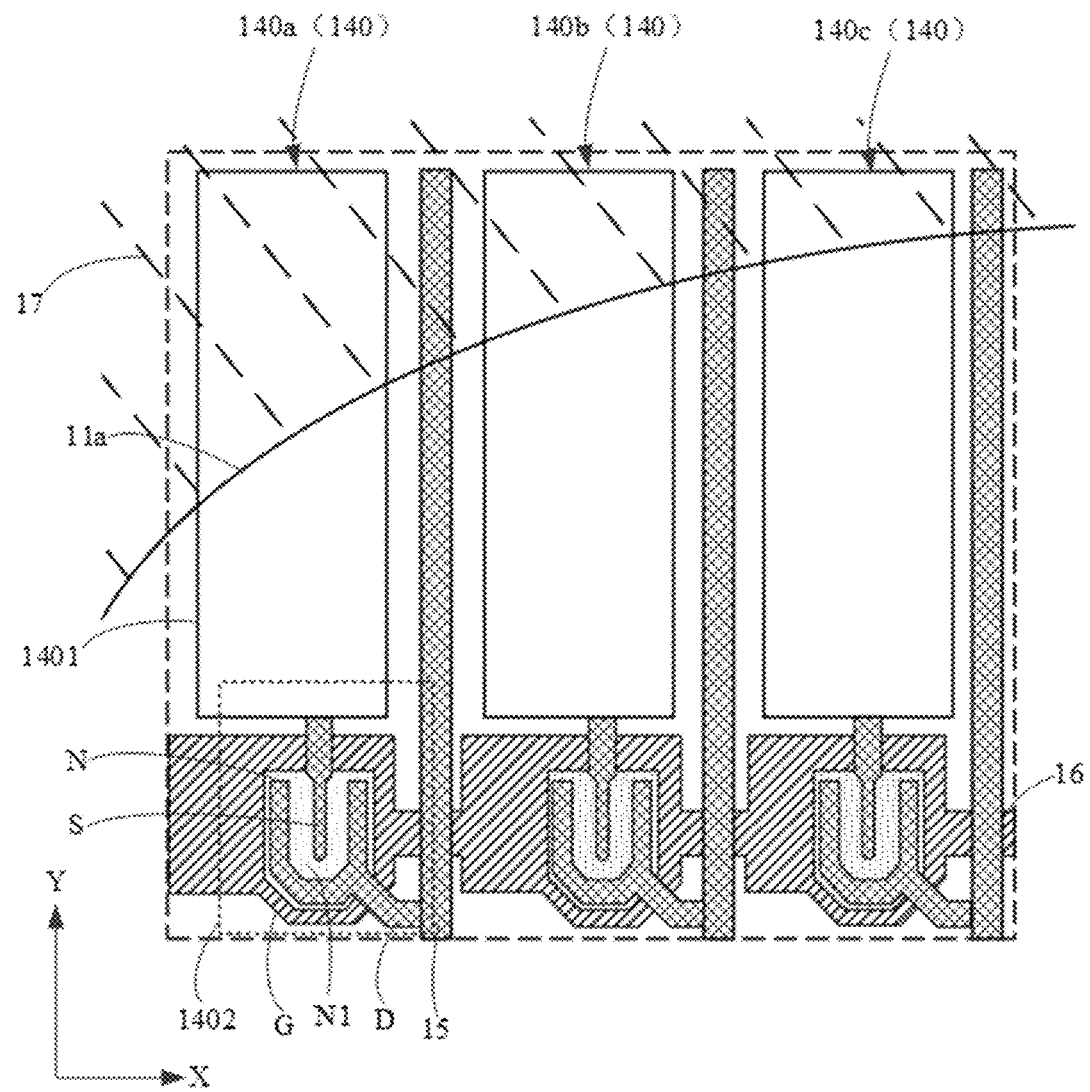
FIG. 7 is a connection schematic diagram showing of an irregularly-shaped pixel unit, a shielding layer, a data signal line and a scanning signal line described in a first embodiment of the present disclosure.

In the present embodiment, as shown in FIGS. 5 and 7, in the first irregularly-shaped pixel unit 14a, the channel width-to-length ratios of the drive transistors 1402 of the sub-pixels 140 are equal, that is, the charging rates of the drive transistors 1402 of the sub-pixels 140 are the same, which may reduce the difficulty in designing the structure of the irregularly-shaped display panel 1 while improving the color cast of the first irregularly-shaped pixel unit 14a.

On the basis of the described structure, the present embodiment corresponds to a specific solution as follows: a pixel unit 14 comprises three RGB (red, green and blue) sub-pixels 140, and in a normal pixel unit 14b, opening regions (light-transmitting regions) of the three RGB sub-pixels 140 are equal; it is assumed that charging rates of drive transistors 1402 of sub-pixels 140 are 10%, and common electrode of the sub-pixels 140 are all the same and are 0 V; a data voltage written by a data signal line 15 is a pixel voltage input voltage of a pixel electrode 1401 of a corresponding sub-pixel 140, in which when a scanning signal of a scanning signal line 16 scans a line in which a first irregularly-shaped pixel unit 14a is located, a picture displayed by the pixel should be a picture having the same light transmittance of the RGB sub-pixels 140; however, as the opening regions of the sub-pixels 140 in an edge region (i.e., the sub-pixels 140 in an irregularly-shaped display unit) are shielded by a shielding layer 17 (for example, BM) in different sizes, causing that the transparency of RGB in the irregularly-shaped display unit is inconsistent, and resulting in color cast.

Figure 8:
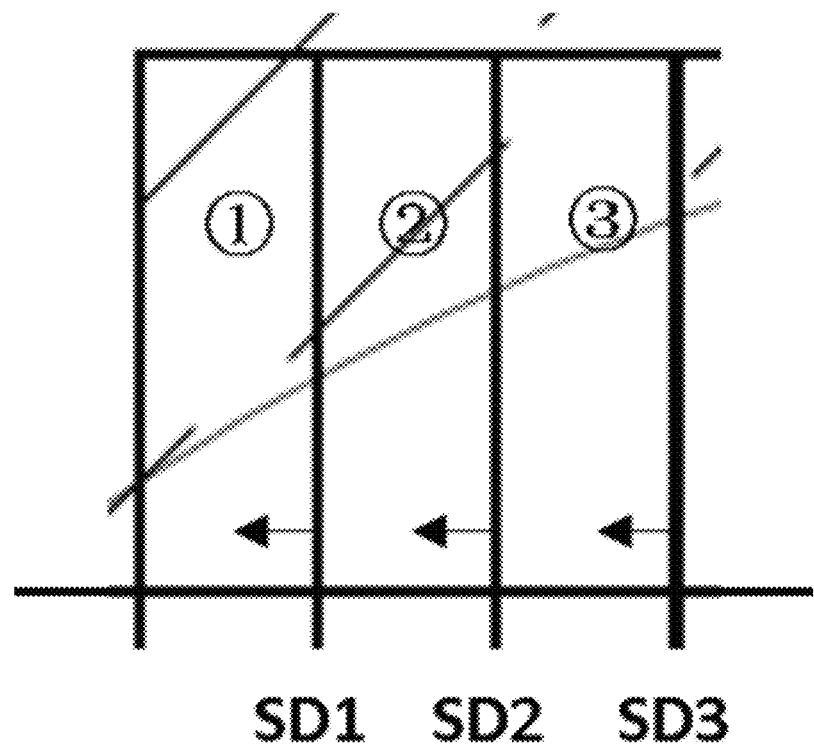
FIG. 8 is a simplified schematic diagram showing an irregularly-shaped pixel unit, a shielding layer, a data signal line and a scanning signal line shown in FIG. 7.
Figure 9:
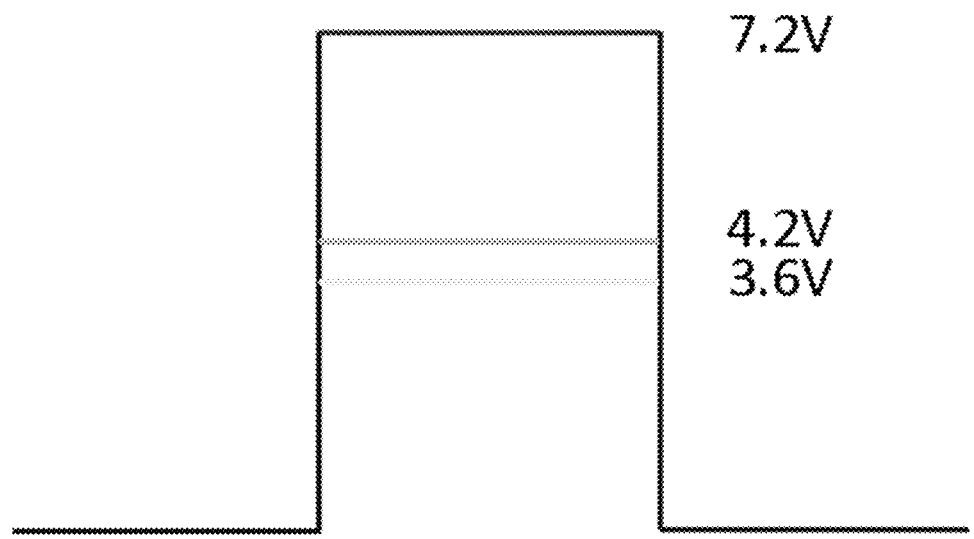
FIG. 9 is a waveform diagram of input voltages of data signal lines corresponding to sub-pixels in the first irregularly-shaped pixel unit shown in FIG. 8.

Referring to FIGS. 5 and 8, it is assumed that the actual light-transmitting region of the sub-pixel ① (for example, the R sub-pixel) of the first irregularly-shaped pixel unit 14a in FIG. 8 is 20% of the actual light-transmitting region of the R sub-pixel of the normal pixel unit 14b, that is, the opening region of the sub-pixel ① of the first irregularly-shaped pixel unit 14a is shielded by the shielding layer 17 by 80%; the sub-pixel ② (for example, the G sub-pixel) of the first irregularly-shaped pixel unit 14a is 40% of the actual light-transmitting region of the G sub-pixel of the normal pixel unit 14b, that is, the opening area of the sub-pixel ② of the first irregularly-shaped pixel unit 14a is shielded by the shielding layer 17 by 60%; the sub-pixel ③ (for example, the B sub-pixel) of the first irregularly-shaped pixel unit 14a is 80% of the actual light-transmitting region of the G sub-pixel of the normal pixel unit 14b, that is, the opening region of the sub-pixel ③ of the first irregularly-shaped pixel unit 14a is shielded by the shielding layer 17 by 20%. At this time, as shown in FIG. 9, in the first irregularly-shaped pixel unit 14a, the data voltage written by the sub-pixel ① corresponding to the data signal line SD1 is 7.2 V; the actual light-transmitting region of the sub-pixel ② is twice as the actual light-transmitting area of the sub-pixel ①, and the data voltage written by the corresponding data signal line SD2 should be a voltage corresponding to half of the 7.2 V voltage corresponding to the penetration, about 4.2 V. Similarly, the voltage written in the sub-pixel ③ should a voltage corresponding to the quarter of the 7.2 V voltage corresponding to the penetration, about 3.6 V. The waveform of the input voltage is shown in FIG. 9.

Second Embodiment

The second embodiment differs from the first embodiment mainly in that: in order to adjust the pixel voltage at the pixel electrode 1401 in the first irregularly-shaped pixel unit 14a, the second embodiment adopts a mode of adjusting the charging rate of the drive transistor 1402 of each sub-pixel 140, i.e., in the first irregularly-shaped pixel unit 14a, the sub-pixel 140 has a larger area of an opening region shielded by the shielding layer 17 has a larger channel width-to-length ratio (W/L) of the drive transistor 1402.

It should be understood that, no special description is made in the second embodiment, and for other structures, reference may be made to the description in the present embodiment, which is not repeated herein.

Figure 10:
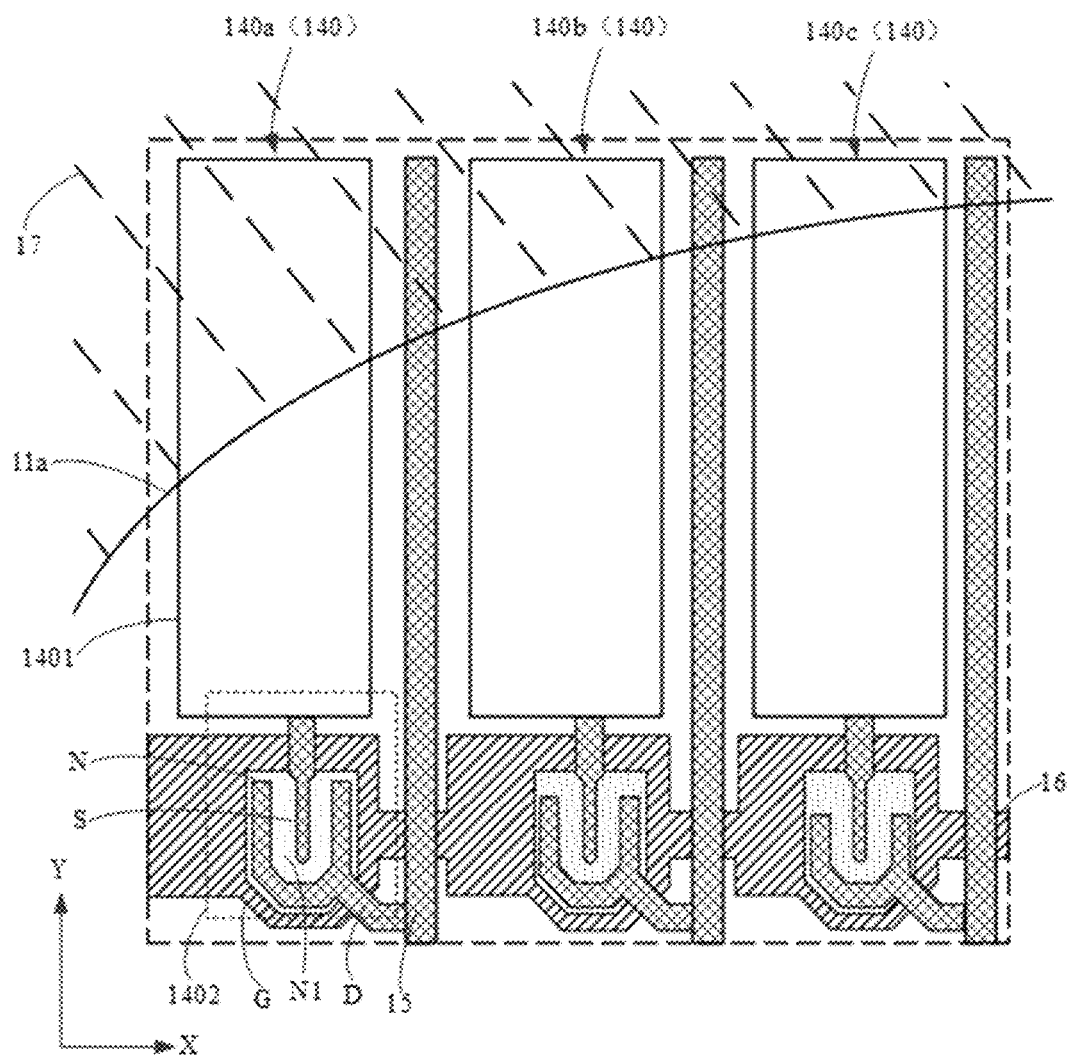
FIG. 10 is a connection structure diagram of an irregularly-shaped pixel unit, a data signal line and a scanning signal line described in a second embodiment.

As shown in FIG. 10, from left to right, in the first irregularly-shaped pixel unit 14a, the area of an opening region of the sub-pixel 140 shielded by the shielding layer 17 is gradually reduced, and the channel width-to-length ratio W/L of the drive transistor 1402 of the sub-pixel 140 is gradually reduced.

During design, the position and size of an opening region of each sub-pixel 140 in the first irregularly-shaped pixel unit 14a which is shielded and not shielded may be determined. Based on the case where the opening regions of the sub-pixels 140 are shielded, a structure of a drive transistor 1402 of the sub-pixels 140 is designed, that is, a sub-pixel 140 having a larger area of an opening region shielded by a shielding layer 17 has a larger channel width-to-length ratio of the drive transistor 1402. That is to say, the sub-pixel 140 having a larger area of an opening region shielded by the shielding layer 17 has a larger charging rate of the drive transistor 1402. In this way, when data voltages written on a data signal line 15 are the same, the sub-pixel 140 having a larger area of an opening region shielded by the shielding layer 17 has a larger pixel voltage at a pixel electrode 1401, so that the transmittance of the sub-pixel is larger; and losses of different areas of opening regions are balanced by adjusting the transmittance, so as to ensure that the brightness of the sub-pixels 140 is more balanced and substantially consistent, thereby improving display color cast of the first irregularly-shaped pixel unit 14a, and ensuring the display effect of the entire display picture.

In addition, in the second embodiment, by adjusting the channel width-to-length ratio W/L of the drive transistor 1402 of each sub-pixel 140, the charging rate of the drive transistor 1402 of each sub-pixel 140 in the first irregularly-shaped pixel unit 14a is distributed to a certain extent, so as to balance the loss of different areas of opening regions of each sub-pixel 140, thereby ensuring that the brightness of each sub-pixel 140 is balanced and substantially consistent, and precisely adjusting the display color cast of the first irregularly-shaped pixel unit 14a.

The drive transistor 1402 in the second embodiment may also have a U-shaped channel region N1, and for its specific structural design, reference may be made to the design of the drive transistor 1402 having the U-shaped channel region N1 mentioned in the first embodiment, and details are not repeated herein.

Figures 11, 12:
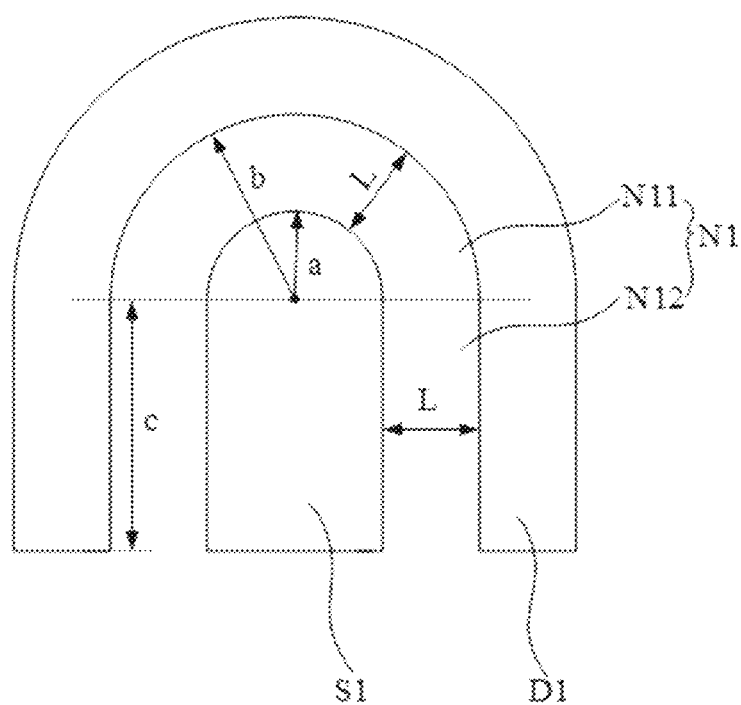
FIG. 11 is a simulation result diagram of a channel width W, a channel length L and a charging rate of the drive transistor described in a second embodiment.
FIG. 12 is an equivalent schematic diagram showing a U-shaped channel region of the drive transistor described in a second embodiment.

With reference to FIGS. 10 and 12, when the drive transistor 1402 in the present second embodiment is a transistor having a U-shaped channel region N1, in the first irregularly-shaped pixel unit 14a, the channel length L of the U-shaped channel region N1 of the drive transistor 1402 of each sub-pixel 140 is equal; and the sub-pixel 140 having a larger area of an opening region shielded by the shielding layer 17 has a larger channel width W of the U-shaped channel region N1 of the drive transistor 1402. That is to say, in the present second embodiment, the channel width W of the U-shaped channel region N1 of the drive transistor 1402 is adjusted to change the channel width-to-length ratio, and compared with the case where the channel length L of the U-shaped channel region N1 is adjusted, the solution of the present second embodiment ensures that the width and length of the channel is adapted to the change of the shielding area of the corresponding opening region, and at the same time, by making the channel length L of the U-shaped channel region N1 of the drive transistor 1402 of each sub-pixel 140 equal, avoiding short circuit of source and drain during the processing of the drive transistor 1402, and increasing the product yield.

As shown in FIG. 11, the present embodiment exemplifies the simulation results of the channel width W, the channel length L and the charging rate of some drive transistors 1402. When the channel length L is 3.7 μm and the channel width W is respectively 3 μm, 6 μm, 9 μm, 12 μm, 15 μm, 20 μm and 25 μm, the charging rates of the drive transistors 1402 are respectively 78.2%, 88.4%, 93.6%, 96.3%, 97.8%, 98.5% and 99.6%.

Further, in the present second embodiment, the U-shaped channel region N1 may be divided into a semi-circular region N11 of an approximate semi-circular ring and an extension region N12 located at both ends of the semi-circular region N11 and having a rectangular shape. As shown in FIG. 12, an inner radius of the semi-circular region N11 is a, an outer radius of the semi-circular region N11 is b, and a channel width of the extension region N12 is c. It should be understood that, during design, a channel length of the semi-circular region N11 is equal to a channel length of the extension region N12, and is defined as a channel length L of the U-shaped channel region N1. The channel length L of the U-shaped channel region N1 is equal to a difference between the outer radius b of the semi-circular region N11 and the inner radius a of the semi-circular region N11, i.e., L=b−a.

In the present embodiment, during design, the position and size of an opening region of each sub-pixel 140 in the first irregularly-shaped pixel unit 14a which is shielded and not shielded may be determined. Based on the case where the opening regions of the sub-pixels 140 are shielded, the magnitude of a pixel voltage corresponding to a pixel electrode 1401 of each sub-pixel 140 is determined, so that the luminance of each sub-pixel 140 is substantially consistent; after the magnitude of the pixel voltage corresponding to the pixel electrode 1401 of each sub-pixel 140 is determined, and when it is determined that data voltages written into a data signal line corresponding to each sub-pixel 140 are equal, the magnitude of a charging rate of a drive transistor 1402 of each sub-pixel 140 may be determined; on the basis of the magnitude of the charging rate of the drive transistor 1402 of each sub-pixel 140, a channel width-to-length ratio W/L of the drive transistor 1402 of each sub-pixel 140 is determined; and after it is determined that the channel width-to-length ratio W/L of the drive transistor 1402 of each sub-pixel 140, a channel width W of the drive transistor 1402 of each sub-pixel 140 may be determined on the basis of the following formula, i.e., The channel length L of the U-shaped channel region N1 and the channel width W of the U-shaped channel region N1 satisfy the following relationship:

$$\frac{W}{L} = \frac{\pi}{\ln\frac{2c+\pi b}{2c+\pi a}}.$$

It is mentioned in the foregoing content that the channel length L of the U-shaped channel region N1 is equal to b−a; therefore, it may be determined that the channel width W of the drive transistor 1402 of each sub-pixel 140 is related to the size of parameters a, b and c in the formula. By adjusting at least one of the parameters a, b and c, the channel width W of the drive transistor 1402 of each sub-pixel 140 may be adjusted, so that the channel width-to-length ratio W/L of the drive transistor 1402 may be adjusted. Such a design is simpler and more accurate.

In addition, it should be understood that, the method for calculating the channel width W of the U-shaped channel region N1 may also be: W(x)=2c+π(a+x), x in the formula is a variable, and the value range of which is greater than 0 and less than b−a. It should be understood that both a and b are greater than 0, b>a, and c is greater than or equal to 0.

Further, in order to avoid short circuit of source and drain of the drive transistor 1402 during the manufacturing process, the channel length L of the U-shaped channel region N1 of the drive transistor 1402 of each sub-pixel 140 may be determined first to be equal and the channel length L value may be determined. In order to reduce the design difficulty, the shapes of the semi-circular regions N11 of the sub-pixels 140 may be determined first to be equal in size, that is, the inner radii a of the semi-circular regions N11 in the U-shaped channel region N1 of each sub-pixel 140 are all equal, the outer radii b of the semi-circular regions N11 in the U-shaped channel region N1 of each sub-pixel 140 are all equal, and then the size of the entire channel width W of the drive transistor 1402 is adjusted by adjusting the channel width c of the extension region N12.

That is to say, in the first irregularly-shaped pixel unit 14a, the inner radii a of the semi-circular region N11 in the U-shaped channel region N1 of each sub-pixel 140 are equal, the outer radii b of the semi-circular region N11 in the U-shaped channel region N1 of each sub-pixel 140 are equal, the sub-pixel 140 having a larger area of an opening region shielded by the shielding layer 17 has a larger channel width c of the extension region N12.

As shown in FIG. 10, from left to right, in the first irregularly-shaped pixel unit 14a, the area of an opening region of the sub-pixel 140 shielded by the shielding layer 17 is gradually reduced, and the channel width c of the extension region N12 of the U-shaped channel region N1 of the drive transistor 1402 of the sub-pixel 140 is gradually reduced.

On the basis of the foregoing content of second embodiment, by adjusting a channel width-to-length ratio (W/L) value of a drive transistor 1402, each sub-pixels 140 of a single first irregularly-shaped pixel unit 14a has different charging and discharging capabilities, which may be designed with high designability; in addition, in second embodiment, a channel width-to-length ratio (W/L) value of the drive transistor 1402 may be adjusted by adjusting a channel width c of an extension region N12 in a U-shaped channel region N1, and such a design may effectively improve the color cast of the first irregularly-shaped pixel unit 14a without increasing any devices or sacrificing the aperture ratio of pixels, thereby improving the display defectivity of the irregularly-shaped display region 12, and the present solution is highly implementable.

Third Embodiment

The third embodiment differs from the first embodiment and the second embodiment mainly in that: in order to adjust the pixel voltage at the pixel electrode 1401 in the first irregularly-shaped pixel unit 14a, the third embodiment is adopted in a manner of adjusting the charging rate of the drive transistor 1402 of each sub-pixel 140, and adjusting the data voltage written into the data signal line 15 correspondingly connected to the sub-pixel 140. That is, in the third embodiment, in the first irregularly-shaped pixel unit 14a, the sub-pixel 140 having a larger area of an opening region shielded by the shielding layer 17 has a larger channel width-to-length ratio of the drive transistor 1402 and a larger data voltage written into the data signal line 15 correspondingly connected thereto.

In the third embodiment, the pixel electrode 1401 at the pixel electrode 1401 of the first irregularly-shaped pixel unit 14a is adjusted and compensated in the above two aspects, thereby improving the compensation accuracy and further improving the color cast of the first irregularly-shaped pixel unit 14a.

It should be understood that, for other designs of the third embodiment, reference may be made to the content of the first embodiment and the second embodiment, and details are not repeated herein.

Fourth Embodiment

Figure 13:
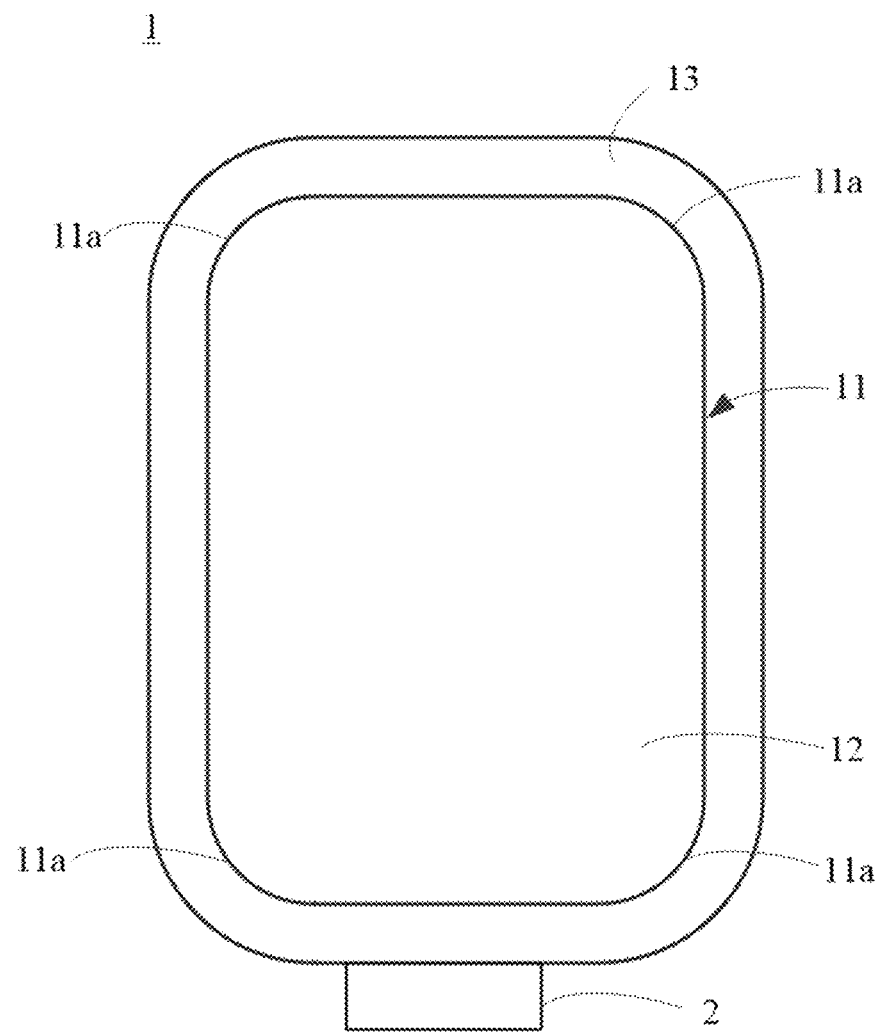
FIG. 13 is a schematic diagram showing the display device described in a fourth embodiment.

The present embodiment further provides a display device. As shown in FIG. 13, in addition to the irregularly-shaped display panel 1 described in the first embodiment to the third embodiment, the display device may further comprise a drive chip 2, and the drive chip 2 may be connected to sub-pixels of the irregularly-shaped display panel.

For example, the drive chip 2 may be a data drive chip, and the data drive chip may be connected to the drain D of the drive transistor of the sub-pixel through an in-plane data signal line 15.

The display device according to the embodiment of the present disclosure may be applied to an electronic device such as a TV set, a mobile phone, a tablet computer, an intelligent wearable device and a notebook computer, which will not be described in detail herein.

The technical solutions of the present disclosure at least have the following technical effects:

In the first irregularly-shaped pixel unit of the irregularly-shaped display panel, a large pixel voltage difference compensation is performed on the sub-pixel having a larger area shielded by the opening region, and a small pixel voltage difference compensation is performed on the sub-pixel having a smaller area shielded by the opening region, that is, the sub-pixel having a larger area shielded by the opening region has a larger pixel voltage difference, such that each sub-pixel in the first irregularly-shaped pixel unit have a balanced brightness, thereby improving the display color cast of the first irregularly-shaped pixel unit, and further ensuring the display effect of the whole display picture.

In the description of the present description, reference terms to "some embodiments", "exemplary", and the like mean that a specific feature, structure, material, or characteristic described in combination with the embodiment or example is included in at least one embodiment or example of the present disclosure. In the present description, the illustrative expressions of the above terms are not necessarily referring to the same embodiments or examples. Furthermore, the particular features, structures, materials, or characteristics described may be combined in any suitable manner in one or more embodiments or examples. In addition, a person skilled in the art may cooperate and combine the different embodiments or examples and the features of the different embodiments or examples described in the description without conflicting with each other.

Although embodiments of the present disclosure have been shown and described, it should be understood by a person skilled in the art that the above embodiments are explanatory and cannot be construed to limit the present disclosure, and changes, modifications, alternatives, and modifications may be made in the above embodiments within the scope of the present disclosure by a person skilled in the art. Therefore, changes and modifications made according to the claims and description of the present disclosure shall belong to the scope of the present disclosure.

What is claimed is:

1. An irregularly-shaped display panel, comprising a pixel unit and a shielding layer, wherein a plurality of pixel units are provided and are arranged in an array; each of the plurality of pixel units comprises a plurality of sub-pixels, an opening region of each of the plurality of sub-pixels comprises a pixel electrode and a common electrode which is opposite to the pixel electrode and is insulated from the pixel electrode, and a pixel voltage difference is formed between the common electrode and the pixel electrode; wherein some of the plurality of pixel units are shielded by the shielding layer to form irregularly-shaped pixel units, and each of the irregularly-shaped pixel units at least comprises a first irregularly-shaped pixel unit; in the first irregularly-shaped pixel unit, the area of an opening region of at least one sub-pixel shielded by the shielding layer is greater than 0 and less than the area of an opening region of at least one sub-pixel, and the areas of opening regions of the remaining sub-pixels shielded by the shielding layer are greater than or equal to 0 and less than the area of an opening region of the remaining sub-pixels; and wherein in the first irregularly-shaped pixel unit, the areas of opening regions of at least two sub-pixels shielded by the shielding layer are different, and the sub-pixel having a larger area of an opening region shielded by the shielding layer has a larger pixel voltage difference.

2. The irregularly-shaped display panel of claim 1, wherein in the first irregularly-shaped pixel unit, the common voltages at the common electrodes of the plurality of sub-pixels are equal to each other, and the sub-pixel having a larger area of the opening region shielded by the shielding layer has a larger pixel voltage of the pixel electrode.

3. The irregularly-shaped display panel of claim 2, further comprising a plurality of columns of data signal lines spaced apart in the row direction and a plurality of rows of scanning signal lines spaced apart in the column direction;
wherein a non-opening region of each of the plurality of sub-pixels comprises a drive transistor, a gate of the drive transistor is connected to the scanning signal line, a first electrode of the drive transistor is connected to the data signal line, a second electrode of the drive transistor is connected to the pixel electrode, one of the first electrode and the second electrode is a drain, and the other of the first electrode and the second electrode is a source;
wherein in the first irregularly-shaped pixel unit, the drive transistors of the plurality of sub-pixels are connected to the scanning signal lines in the same row, and the transistors of the plurality of sub-pixels are connected to the data signal lines in different columns.

4. The irregularly-shaped display panel of claim 3, wherein in the first irregularly-shaped pixel unit, the sub-pixel having a large area of an opening region shielded by the shielding layer has a larger data voltage written into the correspondingly connected data signal line.

5. The irregularly-shaped display panel of claim 3, wherein in the first irregularly-shaped pixel unit, the sub-pixel having a larger opening region is shielded by the shielding layer has a larger channel width-to-length ratio of a drive transistor of the sub-pixel.

6. The irregularly-shaped display panel of claim 5, wherein:
an orthographic projection of an active layer of the drive transistor is positioned within the gate of the drive transistor;
the first electrode of the drive transistor comprises a U-shaped portion and a first connection portion, the U-shaped portion is orthographically projected in the active layer of the drive transistor, and the first connection portion is connected to the U-shaped portion and the data signal line; and
the second electrode of the drive transistor comprises an insertion portion and a second connection portion, the insertion portion is orthographically projected in the active layer of the drive transistor, the insertion portion is inserted into the U-shaped portion to form a U-shaped channel region between the insertion portion and the U-shaped portion, and the second connection portion is connected to the insertion portion and the pixel electrode;
wherein in the first irregularly-shaped pixel unit, the U-shaped channel regions of the drive transistors of the sub-pixels have the same channel length L, and the sub-pixel having a larger area of the opening region shielded by the shielding layer has a larger channel width W of the U-shaped channel region of the drive transistor.

7. The irregularly-shaped display panel of claim 6, wherein:
the U-shaped channel region has a semi-circular region and an extension region which is located at two ends of the semi-circular region and is rectangular, an inner radius of the semi-circular region is expressed as a, an outer radius of the semi-circular region is expressed as b, and a channel width of the extension region is expressed as c;
a channel length of the semi-circular region is equal to a channel length of the extension region and is defined as a channel length L of the U-shaped channel region, and the channel length L of the U-shaped channel region is the difference between an outer radius b of the semi-circular region and an inner radius a of the semi-circular region; and
the channel length L of the U-shaped channel region and the channel width W of the U-shaped channel region satisfy the following relationship:

$$\frac{W}{L} = \frac{\pi}{\ln\frac{2c+\pi b}{2c+\pi a}}.$$

8. The irregularly-shaped display panel of claim 7, wherein in the first irregularly-shaped pixel unit, the inner radii a of the semi-circular regions in the U-shaped channel regions of the sub-pixels are equal, the outer radii b of the semi-circular regions in the U-shaped channel regions of the sub-pixels are equal; and the sub-pixel having a larger area of an opening region shielded by the shielding layer has a larger channel width c of the extension region of the sub-pixel.

9. The irregularly-shaped display panel of claim 1, wherein the sub-pixel having an area of an opening region shielded by the shielding layer larger than 0 and less than that of the opening region of the shielding layer is defined as an irregularly-shaped sub-pixel, and the sub-pixel having an area of an opening region shielded by the shielding layer equal to 0 and less than that of the opening region of the shielding layer is defined as a normal sub-pixel;
the opening region of each of the plurality of sub-pixels further comprises a color filter, and each color filter of the plurality of sub-pixels in the pixel unit are different;
the plurality of pixel units further comprise normal pixel units, the plurality of sub-pixels in the normal pixel units are normal sub-pixels, and at least one sub-pixel in the first irregularly-shaped pixel unit is an irregularly-shaped sub-pixel; and when the normal pixel unit and the first irregularly-shaped pixel unit display the same color, the pixel voltage difference of the irregularly-shaped sub-pixels in the first irregularly-shaped pixel unit is greater than the pixel voltage difference of the normal sub-pixels having the same color in the normal pixel unit.

10. A display device, comprising a drive chip and a irregularly-shaped display panel, wherein the drive chip is connected to sub-pixels of the irregularly-shaped display panel; and the irregularly-shaped display panel comprises a pixel unit and a shielding layer, wherein a plurality of pixel units are provided and are arranged in an array; each of the plurality of pixel units comprises a plurality of sub-pixels, an opening region of each of the plurality of sub-pixels comprises a pixel electrode and a common electrode which is opposite to the pixel electrode and is insulated from the pixel electrode, and a pixel voltage difference is formed between the common electrode and the pixel electrode; wherein some of the pixel units are shielded by the shielding layer to form irregularly-shaped pixel units, and each of the irregularly-shaped pixel units at least comprises a first irregularly-shaped pixel unit; in the first irregularly-shaped pixel unit, the area of an opening region of at least one sub-pixel shielded by the shielding layer is greater than 0 and less than the area of an opening region of at least one sub-pixel, and the areas of opening regions of the remaining sub-pixels shielded by the shielding layer are greater than or equal to 0 and less than the area of an opening region of the remaining sub-pixels; and wherein in the first irregularly-shaped pixel unit, the areas of opening regions of at least two sub-pixels shielded by the shielding layer are different, and the sub-pixel having a larger area of an opening region shielded by the shielding layer has a larger pixel voltage difference.

11. The display device of claim 10, wherein in the first irregularly-shaped pixel unit, the common voltages at the common electrodes of the sub-pixels are equal to each other, and the sub-pixel having a larger area of the opening region shielded by the shielding layer has a larger pixel voltage of the pixel electrode.

12. The display device of claim 11, further comprising a plurality of columns of data signal lines spaced apart in the row direction and a plurality of rows of scanning signal lines spaced apart in the column direction;

wherein a non-opening region of each of the sub-pixels comprises a drive transistor, a gate of the drive transistor is connected to the scanning signal line, a first electrode of the drive transistor is connected to the data signal line, a second electrode of the drive transistor is connected to the pixel electrode, one of the first electrode and the second electrode is a drain, and the other of the first electrode and the second electrode is a source;

wherein in the first irregularly-shaped pixel unit, the drive transistors of the plurality of sub-pixels are connected to the scanning signal lines in the same row, and the transistors of the plurality of sub-pixels are connected to the data signal lines in different columns.

13. The display device of claim 12, wherein in the first irregularly-shaped pixel unit, the sub-pixel having a large area of an opening region shielded by the shielding layer has a larger data voltage written into the correspondingly connected data signal line.

14. The display device of claim 12, wherein in the first irregularly-shaped pixel unit, the sub-pixel having a larger opening region is shielded by the shielding layer has a larger channel width-to-length ratio of a drive transistor of the sub-pixel.

15. The display device of claim 14, wherein:

an orthographic projection of an active layer of the drive transistor is positioned within the gate of the drive transistor;

the first electrode of the drive transistor comprises a U-shaped portion and a first connection portion, the U-shaped portion is orthographically projected in the active layer of the drive transistor, and the first connection portion is connected to the U-shaped portion and the data signal line; and the second electrode of the drive transistor comprises an insertion portion and a second connection portion, the insertion portion is orthographically projected in the active layer of the drive transistor, the insertion portion is inserted into the U-shaped portion to form a U-shaped channel region between the insertion portion and the U-shaped portion, and the second connection portion is connected to the insertion portion and the pixel electrode;

wherein in the first irregularly-shaped pixel unit, the U-shaped channel regions of the drive transistors of the sub-pixels have the same channel length L, and the sub-pixel having a larger area of the opening region shielded by the shielding layer has a larger channel width W of the U-shaped channel region of the drive transistor.

16. The display device of claim 15, wherein:

the U-shaped channel region has a semi-circular region and an extension region which is located at two ends of the semi-circular region and is rectangular, an inner radius of the semi-circular region is expressed as a, an outer radius of the semi-circular region is expressed as b, and a channel width of the extension region is expressed as c;

a channel length of the semi-circular region is equal to a channel length of the extension region and is defined as a channel length L of the U-shaped channel region, and the channel length L of the U-shaped channel region is the difference between an outer radius b of the semi-circular region and an inner radius a of the semi-circular region; and the channel length L of the U-shaped channel region and the channel width W of the U-shaped channel region satisfy the following relationship:

$$\frac{W}{L} = \frac{\pi}{\ln\frac{2c + \pi b}{2c + \pi a}}.$$

17. The display device of claim 16, wherein in the first irregularly-shaped pixel unit, the inner radii a of the semi-circular regions in the U-shaped channel regions of the sub-pixels are equal, the outer radii b of the semi-circular regions in the U-shaped channel regions of the sub-pixels are equal; and the sub-pixel having a larger area of an opening region shielded by the shielding layer has a larger channel width c of the extension region of the sub-pixel.

18. The display device of claim 10, wherein the sub-pixel having an area of an opening region shielded by the shielding layer larger than 0 and less than that of the opening region of the shielding layer is defined as an irregularly-shaped sub-pixel, and the sub-pixel having an area of an opening region shielded by the shielding layer equal to 0 and less than that of the opening region of the shielding layer is defined as a normal sub-pixel;

the opening region of each of the plurality of sub-pixels further comprises a color filter, and each color filter of the plurality of sub-pixels in the pixel unit are different;

the plurality of pixel units further comprise normal pixel units, the sub-pixels in the normal pixel units are normal sub-pixels, and at least one sub-pixel in the first irregularly-shaped pixel unit is an irregularly-shaped sub-pixel; and when the normal pixel unit and the first irregularly-shaped pixel unit display the same color, the pixel voltage difference of the irregularly-shaped sub-pixels in the first irregularly-shaped pixel unit is greater than the pixel voltage difference of the normal sub-pixels having the same color in the normal pixel unit.

* * * * *